United States Patent [19]

Noguchi et al.

[11] Patent Number: 4,626,006
[45] Date of Patent: Dec. 2, 1986

[54] HOSE COUPLING

[75] Inventors: Fujio Noguchi, Nagoya; Yasuo Oguni, Okasaki; Masayuki Shimizu, Toyota, all of Japan

[73] Assignees: Toyota Jidosha Kabushiki Kaisha, Nishikasugai; Toyoda Gosei Co., Ltd., Toyota, both of Japan

[21] Appl. No.: 724,961

[22] Filed: Apr. 19, 1985

[30] Foreign Application Priority Data

Apr. 20, 1984 [JP] Japan .................... 59-58807[U]

[51] Int. Cl.$^4$ ............................................. F16L 41/00
[52] U.S. Cl. ................................. 285/158; 285/184; 285/256
[58] Field of Search ............... 285/158, 184, 185, 283, 285/174, 256

[56] References Cited

U.S. PATENT DOCUMENTS

| 772,091 | 10/1904 | Edwards | 285/283 X |
| 791,397 | 5/1905 | Asbury | 285/184 X |
| 1,626,782 | 5/1927 | Brooks | 285/185 X |
| 2,240,392 | 4/1941 | Dowell | 285/184 X |
| 2,587,938 | 3/1952 | Warren | 285/184 |
| 2,739,778 | 3/1956 | Krone et al. | 285/184 X |
| 3,488,068 | 1/1970 | De Voe | 285/184 X |

Primary Examiner—Thomas F. Callaghan
Attorney, Agent, or Firm—Cushman, Darby & Cushman

[57] ABSTRACT

A hose coupling has a coupling body which is constituted by a hose joint portion connected to a hose, and an eye-joint portion connected to a fixed-side element. The coupling body is provided with a pin for fixing the coupling body. The pin has its distal end portion engaged with a hole provided in the fixed-side element and its proximal end portion connected to the coupling body. The distal and proximal end portions of the pin have their respective axes made to be offset in parallel to each other. The proximal end portion is connected to the coupling body in such a manner that the distal end portion is pivotal about the proximal end portion.

5 Claims, 6 Drawing Figures

HOSE COUPLING

BACKGROUND OF THE INVENTION (1) Field of the Invention

The present invention relates to a hose coupling having a pin which is employed to stabilize a vehicular hose, for example, a brake hose, when it is secured to a brake device.

(2) Description of the Prior Art

Conventional hose couplings include, for example, those which are respectively shown in FIGS. 1 and 3. Referring first to FIG. 1 and to FIG. 2 which represents a sectional view taken along the line II—II of FIG. 1, the reference numeral 1 denotes a brake hose, 2 a brake device serving as a fixed-side element to which the brake hose is to be secured, and 3 a hose coupling. The hose coupling 3 has a coupling body 6 constituted by a hose joint portion 4 and an eye-joint portion 5. The hose coupling 3 is arranged as follows. The coupling body 6 is connected to the brake hose 1 at the hose joint portion 4 in such a manner that a nipple portion 26 is fitted into the connecting end of the brake hose 1 and a sleeve 7 is fitted on the outer periphery of the connecting end. At the eye-joint portion 5, on the other hand, the coupling body 6 is secured to a connecting opening 27 formed in the brake device 2 through a connecting bolt 8 with a bore which is screwed into the connecting opening 27. Further, the eye-joint portion 5 of the coupling body 6 is formed with a projection 9 which is integrally provided with a pin 10 employed to secure the coupling body 6. In assembly, the distal end portion of the pin 10 is engaged with a hole 25 which is formed in the brake device 2, thereby preventing pivoting of the coupling body 6 and swing of the brake hose 1 which would occur when the bolt 8 is tightened, and thus facilitating the tightening operation.

However, since the above-described pin 10 in the conventional hose coupling 3 is fixedly or integrally provided on the coupling body 6, although there is no problem when the brake hose 1 is positioned on the prolongation of the imaginary straight line which connects the respective centers of the pin 10 and the bolt 8, when, for example, an obstruction A is present on the prolongation of the imaginary straight line connecting the respective centers of the pin 10 and the bolt 8 as shown in FIG. 3 and it is therefore not possible for the brake hose 1 to be positioned on the above-described prolongation, it is necessary to employ a hose coupling 11 with a curved shape, such as that shown in FIG. 3, (see, for example, the specification of Japanese Patent Laid-Open No. 217887/1983).

Thus, it has heretofore been disadvantageously necessary to produce hose couplings which have various curved shapes in accordance with the manner in which they are mounted on their respective fixed-side elements.

SUMMARY OF THE INVENTION

It is, accordingly, a primary object of the present invention to provide a hose coupling which eliminates the need to vary the shape of the coupling body irrespective of the existence of any obstruction or the position of an obstruction and is still capable of preventing pivoting of the coupling body and swing of the hose which would occur when the bolt is tightened, thereby allowing the coupling body to be reliably secured to a fixed-side element.

To this end, the present invention provides in a hose coupling in which a coupling body which is constituted by a hose joint portion to be connected to a hose and an eye-joint portion to be connected to a fixed-side element is provided with a pin for fixing the coupling body, the pin having its distal end portion engaged with a hole formed in the fixed-side element and its proximal end portion connected to the coupling body, an improvement characterized in that the respective axes of the distal and proximal end portions of the pin are offset in parallel to each other, and the proximal end portion of the pin is connected to the coupling body in such a manner that the distal end portion is pivotal about the proximal end portion.

In the hose coupling according to the present invention, when the coupling body is to be secured to a fixed-side element by tightening, the distal end portion of the pin is pivoted and engaged with the hole of the fixed-side element and then the coupling body is secured to the fixed-side element, whereby any pivoting of the coupling body and swing of the hose are prevented and it is therefore possible to reliably secure the coupling body to the fixed-side element. Accordingly, if the offset distance between the respective axes of the distal and proximal end portions of the pin is set at a dimension which corresponds to a fixed-side element and this pin is connected to the coupling body, it is then possible for the hose coupling to be employed no matter which way it is intended to be mounted to the fixed-side element simply by employing a coupling body which has only one kind of shape.

Further, in the hose joint according to the present invention, if the proximal end portion of the pin is connected to the center of the projection provided on the eye-joint portion of the coupling body, it is then possible for the distal end portion of the pin to pivot symmetrically about the projection of the coupling body. Accordingly, in a case such as one wherein the positions in which the hose coupling is mounted to the fixed-side element are symmetrical with each other with respect to the imaginary line connecting the respective centers of the hole with which the pin is engaged and the connecting bolt, it is possible to employ the same hose coupling for each case. Thus, allowance is advantageously made for any change in the mounting conditions.

DESCRIPTION OF THE PREFERRED EMBODIMENT

Figure 1:
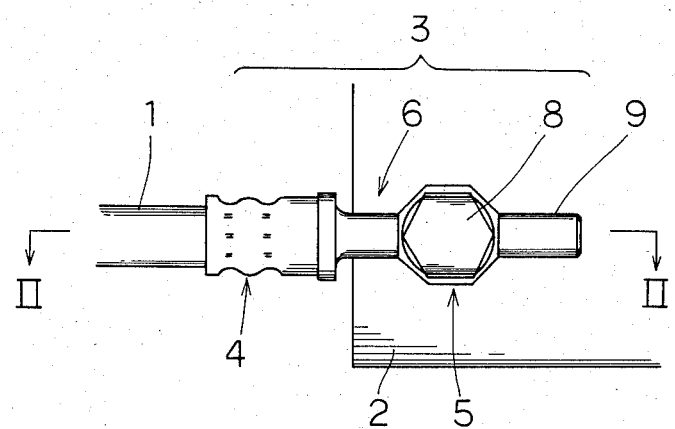
FIG. 1 is a plan view of a conventional hose coupling in the state wherein it is mounted to a fixed-side element.
Figure 2:
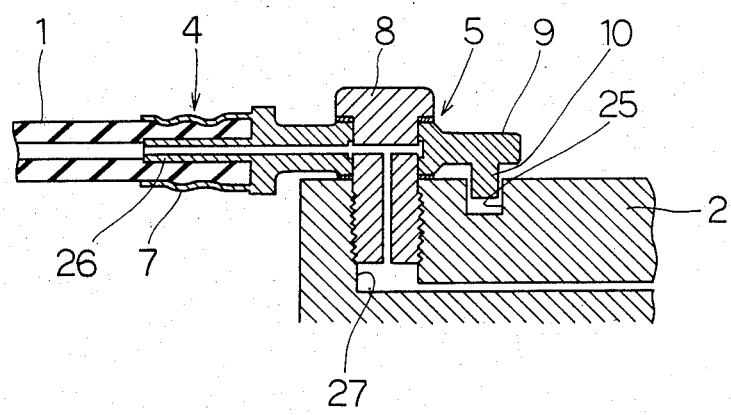
FIG. 2 is a sectional view taken along the line II—II of FIG. 1.
Figure 3:
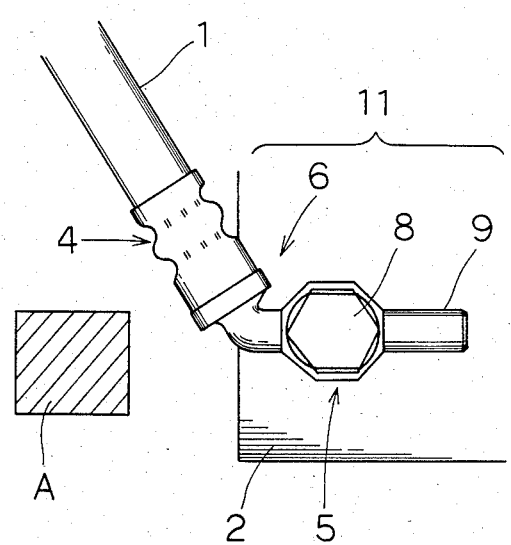
FIG. 3 is a plan view of a conventional hose coupling with a shape different from that of the hose coupling shown in FIG. 1 in the state wherein it is mounted on a fixed-side element.
Figure 4:
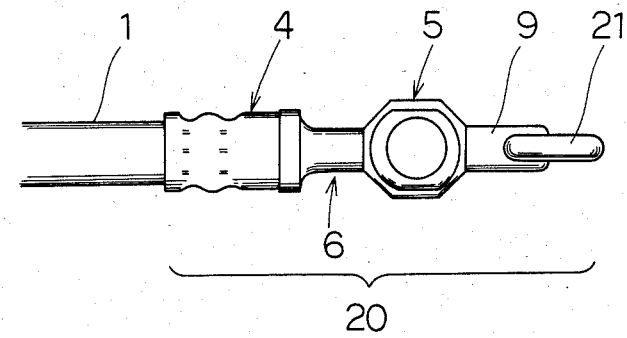
FIG. 4 is a plan view of a hose coupling showing one embodiment of the present invention.
Figure 5:
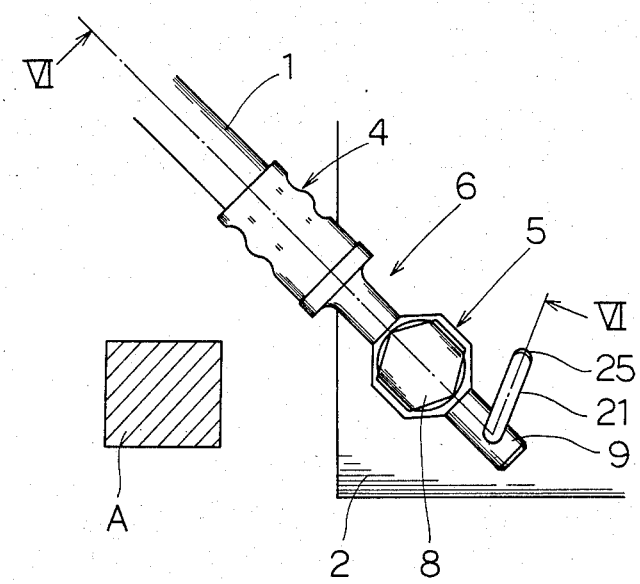
FIG. 5 is a plan view of the hose coupling shown in FIG. 4 in the state wherein it is mounted on a fixed-side element under conditions similar to those shown in FIG. 3.
Figure 6:
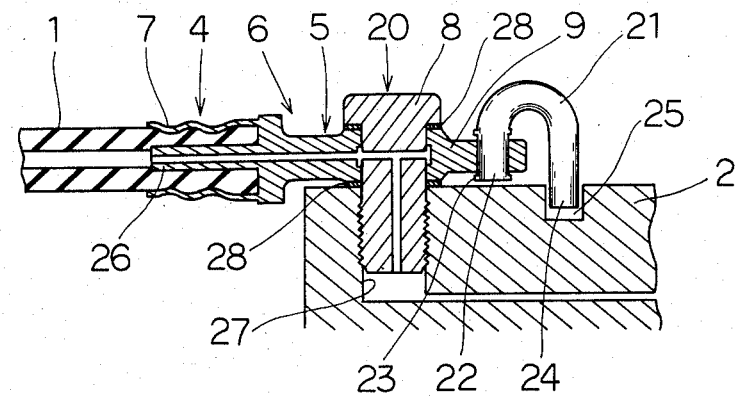
FIG. 6 is a sectional view taken along the line VI—VI of FIG. 5.

FIGS. 4 to 6 in combination show one embodiment of the present invention. It is to be noted that, in the following description, the portions common to those of the prior art are denoted by the common reference numerals and repetitious description is omitted.

In the Figures, the reference numeral 20 represents a hose coupling, while the numeral 21 denotes a pin. The pin 21 has a distal end portion 24 and a proximal end portion 22 which have their respective axes offset from each other in parallel. The distal end portion 24 is formed such as to be slightly longer than the proximal end portion 22 so that the distal end portion 24 is engageable with the hole 25 formed in the brake device 2. Thus, the pin 21 has a substantially inverted U-like shape.

The proximal end portion 22 of the pin 21 is connected to the projection 9 provided on the eye-joint portion 5 of the coupling body 6 at the radial center of the projection 9 in such a manner that the distal end portion 24 is pivotal about the proximal end portion 22. Further, a protuberance 23 is formed by caulking at the portion of the proximal end portion 22 where it is fitted into the projection 9, whereby the pin 21 is prevented from coming off the projection 9.

Accordingly, even in the case where an obstruction A is present on the prolongation of the imaginary straight line connecting the respective centers of the hole 25 with which the pin 21 is engaged and the bolt 8 as shown in FIG. 5, if the pin 21 in which the offset distance between the respective axes of the distal and proximal end portions 24 and 22 is set at a predetermined dimension is connected to the coupling body 6 and pivoted such as to engage with the hole 25, then the imaginary line which connects the respective axes of the distal and proximal end portions 24 and 22 and the center line of the brake hose 1 cross each other such as to form the shape of a V. Thus, it is possible to mount the couping body 6 to the brake device 2 without any interference with the obstruction A. Accordingly, it is possible for the hose coupling to be employed no matter how the coupling body 6 is mounted to the brake device 2 even through the coupling body 6 has only one kind of shape.

Further, in the case where the position in which the coupling body 6 is mounted to the brake device 2 is symmetrical with the above-described mounting position with respect to the imaginary straight line connecting the respective centers of the hole 25 and the bolt 8, the pin 21 in which the offset distance between the respective axes of the distal and proximal end portions 24 and 22 is set at a predetermined dimension is connected and pivoted about the projection 9 symmetrically with the above-described pivoting such as to engage with the hole 25, whereby the change in mounting conditions is appropriately adjusted. Thus, it becomes possible to cope with any change in the manner of mounting by the use of the same hose coupling 20.

We claim:

1. A hose coupling comprising;
    (a) a coupling body constituted by a hose joint portion connected to a hose, and an eye-joint portion connected to a fixed-side element; and
    (b) a pin having its distal and proximal end portions formed such that their respective axes are offset in parallel to each other, said distal end portion being engaged with a hole provided in said fixed-side element when said coupling body is secured to said fixed-side element, and said proximal end portion being connected to said coupling body in such a manner that said distal end portion is pivotal about said proximal end portion.

2. A hose coupling according to claim 1, wherein said pin proximal end portion is connected to the center of a projection which is provided on said eye-joint portion of said coupling body.

3. A hose coupling according to claim 1, wherein said pin is formed such as to have a substantially U-like shape.

4. A hose coupling according to claim 2, wherein said pin is formed such as to have a substantially U-like shape.

5. The hose coupling as claimed in claim 1 wherein said pin is substantially U-shaped and said distal end portion and proximal end portion extend substantially parallel to one another and parallel to a plane passing through said eye-joint portion and said coupling body.

* * * * *

UNITED STATES PATENT AND TRADEMARK OFFICE
CERTIFICATE OF CORRECTION

PATENT NO. : 4,626,006

DATED : Dec. 2, 1986

INVENTOR(S) : NOGUCHI, et al.

It is certified that error appears in the above-identified patent and that said Letters Patent is hereby corrected as shown below:

In the Heading:

[73]  Assignees:  Toyota Jidosha Kabushiki Kaisha, Toyota;
Toyoda Gosei Co., Ltd., Nishikasugai, both of Japan Signed and Sealed this Tenth Day of January, 1989

Attest:

DONALD J. QUIGG

*Attesting Officer*     *Commissioner of Patents and Trademarks*